(12) United States Patent
Klassen et al.

(10) Patent No.: US 11,557,785 B2
(45) Date of Patent: Jan. 17, 2023

(54) ELECTRODE ASSEMBLY AND FLOW BATTERY WITH IMPROVED ELECTROLYTE DISTRIBUTION

(71) Applicant: Invinity Energy Systems (Canada) Corporation, Vancouver (CA)

(72) Inventors: Andrew Klassen, North Vancouver (CA); Ricky Blacker, Surrey (CA)

(73) Assignee: INVINITY ENERGY SYSTEMS (CANADA) CORPORATION, Vancouver (CA)

( * ) Notice: Subject to any disclaimer, the term of this patent is extended or adjusted under 35 U.S.C. 154(b) by 0 days.

(21) Appl. No.: 15/930,350

(22) Filed: May 12, 2020

(65) Prior Publication Data
US 2020/0313219 A1 Oct. 1, 2020

Related U.S. Application Data

(62) Division of application No. 15/777,161, filed as application No. PCT/US2016/061991 on Nov. 15, 2016, now abandoned.
(Continued)

(51) Int. Cl.
*H01M 8/18* (2006.01)
*H01M 8/04186* (2016.01)
(Continued)

(52) U.S. Cl.
CPC ............ *H01M 8/188* (2013.01); *C25B 11/03* (2013.01); *C25B 15/08* (2013.01);
(Continued)

(58) Field of Classification Search
CPC .. H01M 8/188; H01M 8/2459; H01M 8/0202; H01M 8/0273; H01M 8/04186;
(Continued)

(56) References Cited

U.S. PATENT DOCUMENTS

| 7,579,112 B2 | 8/2009 | Chiang et al. |
| 2003/0087156 A1 | 5/2003 | Broman et al. |

(Continued)

FOREIGN PATENT DOCUMENTS

| CN | 103682408 A | 3/2014 | |
| GB | 1576273 A | * 10/1980 | ............ H01M 50/77 |

(Continued)

*Primary Examiner* — Christopher P Domone
*Assistant Examiner* — Kimberly Wyluda
(74) *Attorney, Agent, or Firm* — Seed IP Law Group LLP

(57) ABSTRACT

An electrode assembly for a flow battery is disclosed comprising a porous electrode material, a frame surrounding the porous electrode material, at least a distributor tube embedded in the porous electrode material having an inlet for supplying electrolyte to the porous electrode material and at least another distributor tube embedded in the porous electrode material having an outlet for discharging electrolyte out of the porous material. The walls of the distributor tubes are preferably provided with holes or pores for allowing a uniform distribution of the electrolyte within the electrode material. The distributor tubes provide the required electrolyte flow path length within the electrode material to minimize shunt current flowing between the flow cells in the battery stack.

12 Claims, 8 Drawing Sheets

Related U.S. Application Data

(60) Provisional application No. 62/256,847, filed on Nov. 18, 2015.

(51) Int. Cl.

| | | |
|---|---|---|
| *H01M 8/2455* | (2016.01) | |
| *H01M 8/0258* | (2016.01) | |
| *H01M 4/86* | (2006.01) | |
| *H01M 8/0273* | (2016.01) | |
| *H01M 8/04276* | (2016.01) | |
| *C25B 11/03* | (2021.01) | |
| *C25B 15/08* | (2006.01) | |
| *H01M 8/24* | (2016.01) | |
| *H01M 8/0202* | (2016.01) | |
| *H01M 8/248* | (2016.01) | |

(52) U.S. Cl.
CPC ....... *H01M 4/8605* (2013.01); *H01M 8/0202* (2013.01); *H01M 8/0258* (2013.01); *H01M 8/0273* (2013.01); *H01M 8/04186* (2013.01); *H01M 8/04283* (2013.01); *H01M 8/248* (2013.01); *H01M 8/2455* (2013.01); *H01M 8/2459* (2016.02); *Y02E 60/50* (2013.01)

(58) Field of Classification Search
CPC ........... H01M 8/04283; H01M 8/2455; H01M 8/248; H01M 4/8605; C25B 11/03; C25B 15/08; Y02E 60/50
See application file for complete search history.

(56) References Cited

U.S. PATENT DOCUMENTS

| | | |
|---|---|---|
| 2011/0223450 A1 | 9/2011 | Horne et al. |
| 2011/0223451 A1 | 9/2011 | Winter et al. |
| 2011/0281169 A1 | 11/2011 | Zheng et al. |
| 2012/0107715 A1 | 5/2012 | Ohmori et al. |
| 2012/0244395 A1 | 9/2012 | Perry |
| 2014/0065460 A1 | 3/2014 | Evans et al. |
| 2014/0186697 A1 | 7/2014 | Cobb |
| 2014/0186698 A1 | 7/2014 | Cobb et al. |
| 2015/0295247 A1* | 10/2015 | Kumbur .............. H01M 4/8626 429/418 |

FOREIGN PATENT DOCUMENTS

| | | | |
|---|---|---|---|
| WO | WO-2012032368 A1 * | 3/2012 | ............ H01M 8/188 |
| WO | 2014/117379 A | 8/2014 | |
| WO | 2016/072254 A1 | 5/2016 | |

* cited by examiner

A - A

ELECTRODE ASSEMBLY AND FLOW BATTERY WITH IMPROVED ELECTROLYTE DISTRIBUTION

TECHNICAL FIELD

The present invention relates to an electrode assembly for a flow battery having a construction that allows an improved electrolyte distribution within the electrode material and to a flow battery comprising such electrode assemblies.

BACKGROUND

Flow batteries, also known as redox flow batteries, convert electrical energy into chemical energy that can be stored and then converted into electrical energy which is released when there is a demand.

Flow batteries are distinguished from other electrochemical devices, for example from fuel cells, by the use of liquid electrolytes that participate in a reversible electro-chemical reaction. Fuel cells use gaseous fuels to produce energy, they do not store energy whereas flow batteries do not generate any energy, they store and release energy. This is a basic difference between fuel cells and flow batteries, but there are many other differences between these two types of electrochemical cells, some of which are further described here.

A basic flow battery, such as the one illustrated in FIG. 1 by reference number 10, comprises a redox flow cell 11 that has a negative electrode 12 and a positive electrode 14 separated by a separator 16. A negative liquid electrolyte 17 is delivered from the storage tank 18 to the negative electrode and a positive liquid electrolyte 19 is delivered from the storage tank 20 to the positive electrode to drive the electrochemically reversible redox reactions. The separator can be a micro-porous separator or an ion exchange membrane and it separates the electrodes and prevents the electrolytes from mixing, but allows selected ions to pass through to complete the redox reactions. As shown, the flow battery comprises a first collector plate 22 and a second collector plate 24 which are each arranged adjacent to the porous electrodes 12 and respectively 14. The porous electrodes are composed of a material that is electrically conductive and catalytically active with regard to the liquid electrolytes 17 and respectively 19, and preferably corrosion resistant. The collector plates are preferably made of material that is highly conductive and chemically stable in the highly acidic environment inside the flow cells. The collector plates are coupled to conductors 26 and 28 which complete a circuit through either an electrical power source 30 (for charging) or to electrical power load 32 (for discharge) via an electrical switch 34.

The positive and negative electrodes in FIG. 1, separated by a separator, form a flow cell 11. A flow battery stack generally comprises more than one flow cell, depending on the designed capacity of the flow battery, and two neighbouring flow cells are separated by a bipolar plate. In operation, liquid electrolytes 17 and 19 are delivered to the stack of flow cells to either convert electrical energy into chemical energy or to convert chemical energy into electrical energy that can be discharged through an electrical connection to a power load.

In some flow batteries, each of the electrolytes flows entirely through a porous electrode from each cell's inlet to outlet. In this type of flow battery, the electrolyte flow can experience a high pressure drop because of the flow resistance through the porous material of the electrodes. In other flow batteries, liquid electrolytes flow through channels provided on either side of the bipolar plates, and diffuse into the adjacent electrodes. This type of design provides less of a pressure drop because the electrolytes flow unrestricted through the flow channels, but the performance is relatively low because of the non-uniform distribution of the electrolytes into the electrodes.

Some flow batteries provided with flow field channels in the bipolar plates have addressed this problem by changing the design of the flow field trying to achieve a relatively uniform distribution of the electrolyte within the electrodes and to prevent any electrolyte concentration gradients in the electrodes.

For example, to solve this problem, United States patent application number 20120244395 describes flow fields having interdigitated channels with at least partially blocked outlets or inlets to thereby force the electrolytes to flow under the ribs of the channels through the liquid-porous electrodes. It is claimed that the forced flow of the liquid electrolytes under the ribs and through the electrodes provides a lower pressure drop than if the flow was entirely through the electrodes like in the flow-through arrangement of some of the flow batteries, as described above, and has the benefit of enhancing the exposure of the electrolyte to the electrode.

In other designs, as described for example in International Patent Application WO 2016/072254, the bipolar plate is provided with longitudinal grooves, formed into or cut into the molded plate, which create electrolyte supply channels and electrolyte discharge channels which help reduce the plate frame deformation caused by the pressure imbalance between the supply side and the discharge side. The bipolar plate further comprises electrolyte guiding sections between the electrolyte supply and discharge channels, which guide the electrolyte flow to the electrodes. The electrolyte supply and discharge channels are covered by a plastic protective plate which helps guide the electrolyte flow to the electrodes. The applicant states that a better performance is achieved if the electrolyte guiding sections are provided with grooves to facilitate a better distribution of the electrolyte to the electrodes. Each electrode of the cells in this prior art document, for example the positive or the negative electrode, is not formed in one piece, but rather divided into at least two parts, each part facing an electrolyte guiding section on the bipolar plate. The electrode parts are placed at a certain distance from the electrolyte supply and discharge channels to create electrolyte guide areas and they are allowed only to partially cover the electrolyte supply and discharge channels. The design disclosed in this prior art document is complicated involving electrodes comprising several parts, plastic protective plates covering the electrolyte circulation grooves cut or formed into the bipolar plates and arrangements that require the proper positioning of the electrode parts such that they do not interfere with the electrolyte circulation channels.

Another problem characteristic to flow batteries in general is that the electrolyte feed ports into the flow cells are conductive paths for current leakage from one cell to the next cell in the stack. The problem of shunt current through the fluid path due to the ionically conductive electrolyte is not a problem, for example, in fuel cells, but it is something that needs to be addressed in a flow battery. This problem can be solved by increasing the effective resistance along the flow paths into and away from the cell to reduce current leakage from cell to cell. One way of achieving an increased resistance is to increase the electrolyte flow path length to cross section area ratio, which was generally done by increasing the electrolyte flow path within the frame surrounding the electrode. The increase of electrolyte flow path length has to be balanced with the need to reduce the electrolyte pressure drop as it flows through the cell to thereby reduce the electrolyte pumping energy loss and to achieve a uniform flow distribution in each cell.

During assembly, the stack of flow cells are placed between two end plates and are kept together in contact through the compression force applied to the end plates. The compression force necessary for assembling a flow battery stack is lower than for example the compression necessary for assembling a fuel cell stack. In flow batteries, the stack typically has plastic frames and metal or plastic end plates with metal rods and nuts holding it together. Because plastic and metal have very different thermal expansion coefficients, springs are required in the clamping system to ensure a constant desired stack compression force over temperature fluctuations.

In view of the known difficulties associated with the existing systems there is a need for a flow battery that allows a better electrolyte distribution through the electrodes and diminishes the risk of shunt currents occurring in the stack by using a simple and efficient construction of the electrode assembly and of the cell stack assembly.

SUMMARY OF THE INVENTION

The present invention describes an electrode assembly for a flow battery, the electrode assembly comprising a porous electrode material, a frame surrounding the porous electrode material, at least a distributor tube embedded in the porous electrode material having an inlet for supplying electrolyte to the porous electrode material, and at least another distributor tube embedded in the porous electrode material having an outlet for discharging electrolyte out of the porous electrode material. The frame and the distributor tubes are made of an electrically non-conductive plastic material.

In preferred embodiments of the electrode assembly according to the present invention, the distributor tubes extend between a first side of the frame and a second side of the frame, beyond the midpoint between the two sides of the frame.

In the first embodiment of the present invention, the distributor tubes which have an inlet for supplying electrolyte to the porous electrode material each have an outlet sealed to the frame and the distributor tubes which have an outlet for discharging electrolyte out of the porous electrode material each have an inlet sealed to the frame.

The distributor tubes are hollow tubes having an interior flow passage and a wall surrounding the interior passage. In preferred embodiments, the wall of the hollow tubes is made of a solid material provided with holes to allow the flow of electrolyte through the wall of the distributor tube into the porous electrode material. Alternatively, the wall of the hollow tubes can be made of a porous material to allow the flow of electrolyte through the wall of the distributor tube.

In a second embodiment of the present invention, the distributor tubes which have an inlet for supplying electrolyte to the electrode material each have an outlet open to the porous electrode material and the distributor tubes which have an outlet for discharging electrolyte out of the electrode material each have an inlet open to the porous electrode material. In such embodiments, the distributor tubes are hollow tubes, having an interior flow passage and a wall surrounding the interior passage, and the wall of at least one of the hollow tubes can be made of a solid material. In such embodiments, the wall of the hollow tubes can also be made of a porous material or of a solid material provided with at least one hole for allowing a better distribution of electrolyte within the porous electrode material.

In some embodiments of the present electrode assembly, the distributor tubes are hollow tubes having an interior flow passage made of a porous material having a higher porosity than the porosity of the tube wall.

Generally, the distributor tubes have a circular cross-section. Alternatively, as described here, the distributor tubes can have a triangular cross-section.

In preferred embodiments, the distributor tubes are entirely embedded within the porous electrode material. Yet, in other embodiments, the distributor tubes are only partially embedded in the porous electrode material.

In some embodiments of the present invention, the distributor tubes of the electrode assembly can be hollow tubes having a serpentine shape and the wall of each distributor tube can be made of a solid material provided with at least one hole or of a porous material for allowing the distribution of electrolyte within the porous electrode material.

The embodiments of the electrode assembly described here can comprise a plurality of distributor tubes which are evenly distributed across the area of the electrode material. In some embodiments, at least some of distributor tubes of the electrode assembly have the same cross-sectional flow areas or are equal in length.

The distributor tubes of the present electrode assembly can be made of polyethylene or polypropylene, or other electro-conductive materials that are compatible with the highly acid environment within a flow battery, such as polytetrafluoroethylene (PTFE), polyvinylidene fluoride (PVDF), ethyl vinyl acetate (EVA), PE copolymers, UHMW PE, thermoplastic polyurethane, polyethersulfone, polycarbonate and polycarbonate alloys.

The present invention also refers to a flow battery comprising at least one flow cell which comprises a negative electrode assembly and a positive electrode assembly which have the construction and features described above. Each flow cell further comprises a separator separating the positive electrode assembly and the negative electrode assembly, and a first and a second bipolar plate, each bipolar plate being adjacent to a respective electrode assembly.

Furthermore, the present invention also describes a flow battery which comprises a stack of flow cells enclosed in a cylindrical plastic shell provided with two end plates, the stack of flow cells being connected to the inside wall of the cylindrical plastic shell, whereby the cylindrical plastic shell compresses the flow cells in a radial direction and the two end plates compress the flow cells in an axial direction. The fuel cells in the stack are separated by bipolar plates, each flow cell comprising a positive electrode assembly and a negative electrode assembly, separated by a separator, each electrode assembly comprising a porous electrode material surrounded by a frame. The cylindrical plastic shell and the two end plates which enclose the stack of fuel cells are made of an electrically non-conductive material.

In preferred embodiments, the material of the cylindrical plastic shell and of the end plates has the same or about the same thermal expansion coefficient as the material of the frames. For example, the material of the frames, of the cylindrical plastic shell and of the end plates can be polyethylene or polypropylene.

The stack of flow cells has a rectangular exterior shape with its corners connecting with the interior surface of the cylindrical plastic shell to create four compartments between the stack and the cylindrical plastic shell, more specifically the corners of the stack are connected to the interior wall of the cylindrical plastic shell through seals to create four sealed compartments between the stack and the cylindrical plastic shell for flowing positive and negative electrolytes therethrough. Two of the compartments are for flowing a positive electrolyte therethrough and two other compartments are for flowing a negative electrolyte therethrough.

In some embodiments, the stack of flow cells enclosed in a cylindrical shell provided with two end plates which compresses the flow cells in a radial and respectively in an axial direction, as described above, comprises flow cells having an electrode assembly having the construction described in the present invention, more specifically the electrode assembly comprises a porous electrode material, a frame surrounding the porous electrode material and at least a distributor tube embedded in the porous electrode material, having an inlet for supplying electrolyte to the porous electrode material, and at least another distributor tube embedded in the porous electrode material having an outlet for discharging electrolyte out of the porous electrode material. Such an electrode assembly can have any of the features described in present invention.

A method of manufacturing an electrode assembly for a flow battery according to the present invention is also described, the method comprising the steps of:
 positioning a porous electrode material within a frame;
 inserting locating needles through holes provided in the frame surrounding the porous electrode material and into the porous electrode material;
 sliding distributor tubes through the holes provided in the frame and through holes provided in the porous electrode material by inserting the locating needles within the porous electrode material, to thereby locate the distributor tubes within the porous material and relative to the frame; and
 sealing the distributor tubes within the holes of the frame.

In another embodiment, the method of manufacturing an electrode assembly for a flow battery comprises the steps of:
 a. securing at least one distributor tube to an electrode frame;
 b. positioning a porous electrode material next to the electrode frame over the distributor tube; and
 c. compressing the electrode frame, the distributor tube and the porous electrode material to at least partially embed the distributor tube within the porous electrode material.

In all embodiments, when the electrode assembly of the flow battery is one that comprises some distributor tubes that have to have their inlet or respectively their outlet closed, the method of manufacturing the electrode assembly further comprises sealing the ends of those distributor tubes to prevent electrolyte flow through their inlet or outlet.

A method of manufacturing a flow battery stack is also described, the method comprising the steps of:
 a. securing at least one distributor tube to an electrode frame;
 b. positioning successively an electrode frame with distributor tubes, an electrode material, a separator, another electrode material, another electrode frame with distributor tubes one over the other;
 c. repeating the steps a) and b) until a desired number of flow cells in the stack is reached; and
 d. compressing a stack of components formed in steps a) to c) to at least partially embed the distributor tubes within the porous electrode material.

When the electrode assembly comprises some distributor tubes that have to have their inlet or respectively their outlet closed, the method of manufacturing the flow battery further comprises sealing the ends of those distributor tube to prevent electrolyte flow through their inlet or outlet.

A method of making a flow battery is also disclosed wherein the flow battery comprises a stack of flow cells enclosed in a cylindrical plastic shell provided with two end plates and wherein the method comprises the steps of:
 a. providing the cylindrical plastic shell and the two end plates;
 b. placing the stack of flow cells within the cylindrical plastic shell such that the flow cells are connected to the inside wall of the cylindrical plastic shell and the cylindrical plastic shell compresses the flow cells in a radial direction; and
 c. compressing the stack of flow cells in axial direction between the two end plates.

BRIEF DESCRIPTION OF THE DRAWINGS

The drawings illustrate specific preferred embodiments of the invention, but should not be considered as restricting the spirit or scope of the invention in any way.

DETAILED DESCRIPTION

Certain terminology is used in the present description and is intended to be interpreted according to the definitions provided below. In addition, terms such as "a" and "comprises" are to be taken as open-ended.

Herein, in a quantitative context, the term "about" should be construed as being in the range up to plus 20% and down to minus 20%.

The term "entirely embedded" is used herein to describe a distributor tube that is placed within the porous material of the electrode such that outer surface of the tube is surrounded by electrode material.

The term "partially embedded" is used herein to describe a distributor tube that is placed within the porous material of the electrode with at least a portion of the outer surface of the distributor tube not surrounded by electrode material.

Figure 1:
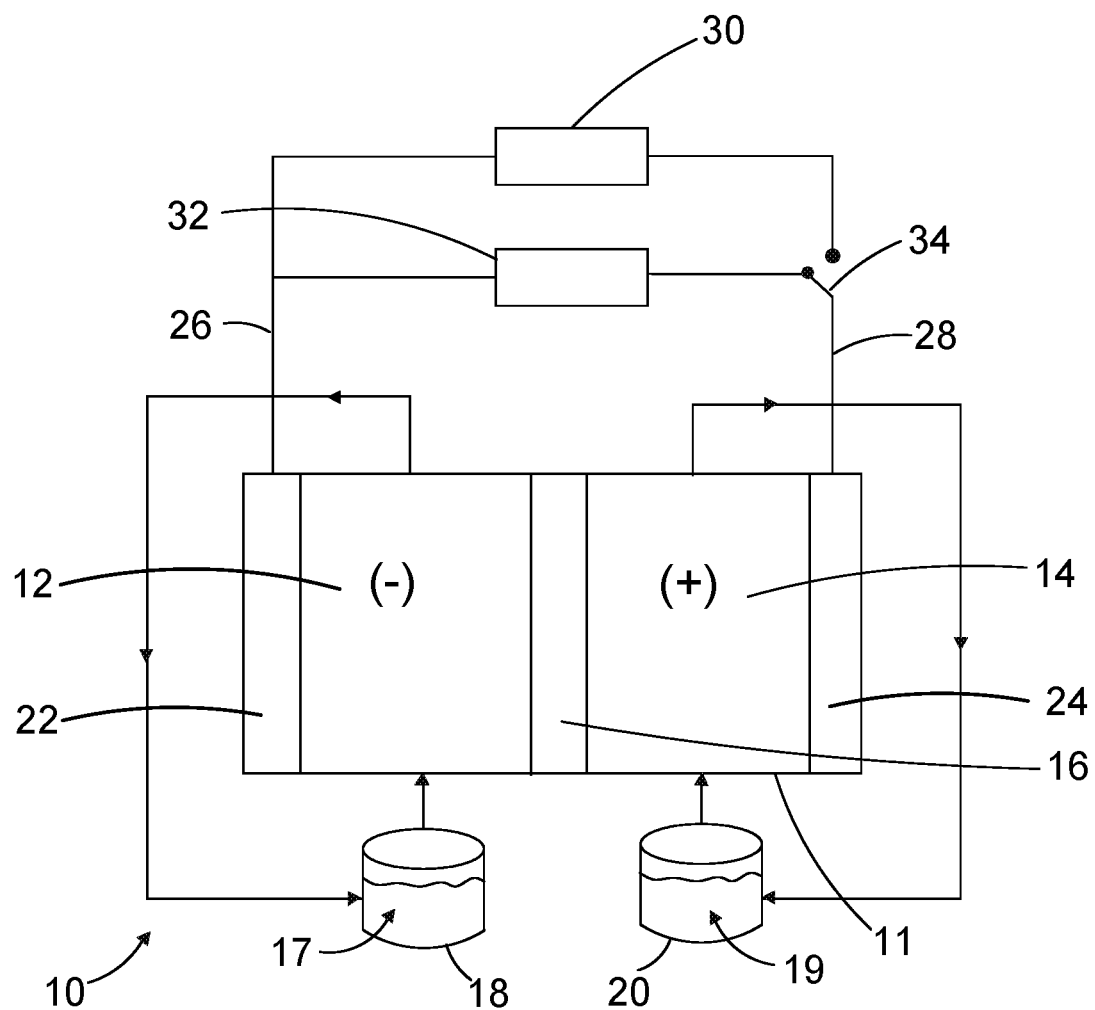
FIG. 1 illustrates an example of a conventional flow battery.
Figure 2A:
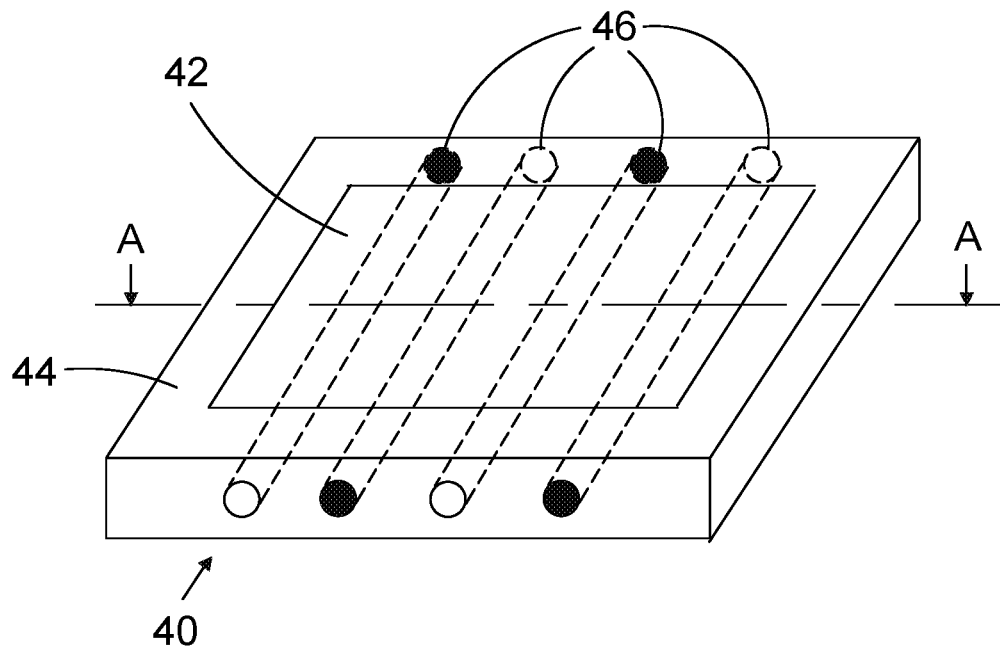
FIG. 2A shows a schematic view of an electrode assembly according to a preferred embodiment of the invention.

FIG. 2A shows a schematic view of an electrode assembly according to a preferred embodiment of the invention. Electrode assembly 40 comprises a porous electrode material 42 surrounded by a frame 44 and distributor tubes 46 embedded within the porous electrode material 42. In this embodiment, distributor tubes 46 are entirely embedded in the porous electrode material as further illustrated in FIG. 2B which represents a cross-section of the electrode assembly 40 along line A-A.

Figure 2B:
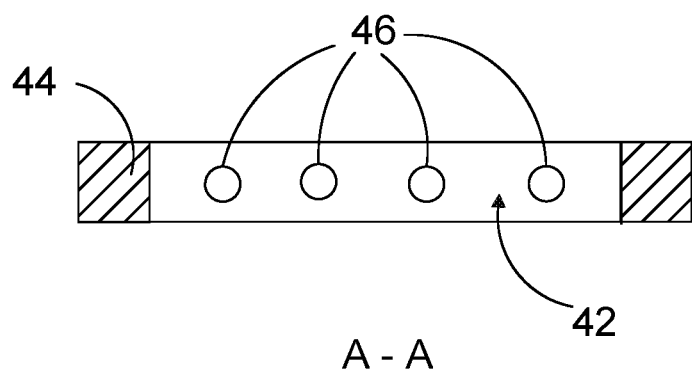
FIG. 2B shows a cross-section through the electrode assembly represented in FIG. 2A along line A-A.
Figure 2D:
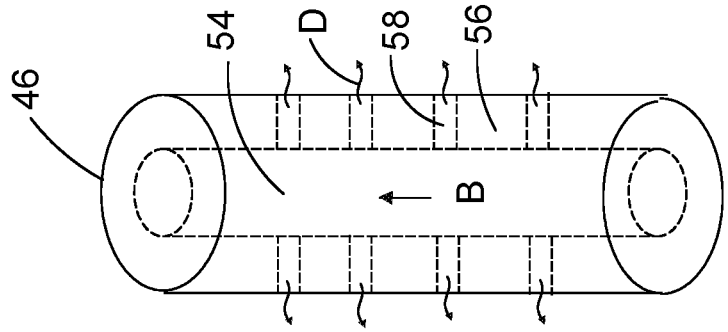
FIG. 2D shows a cross-sectional view through one of distributor tubes of the present invention, especially with reference to the embodiment represented in FIGS. 2A, 2B and 2C.
Figure 2C:
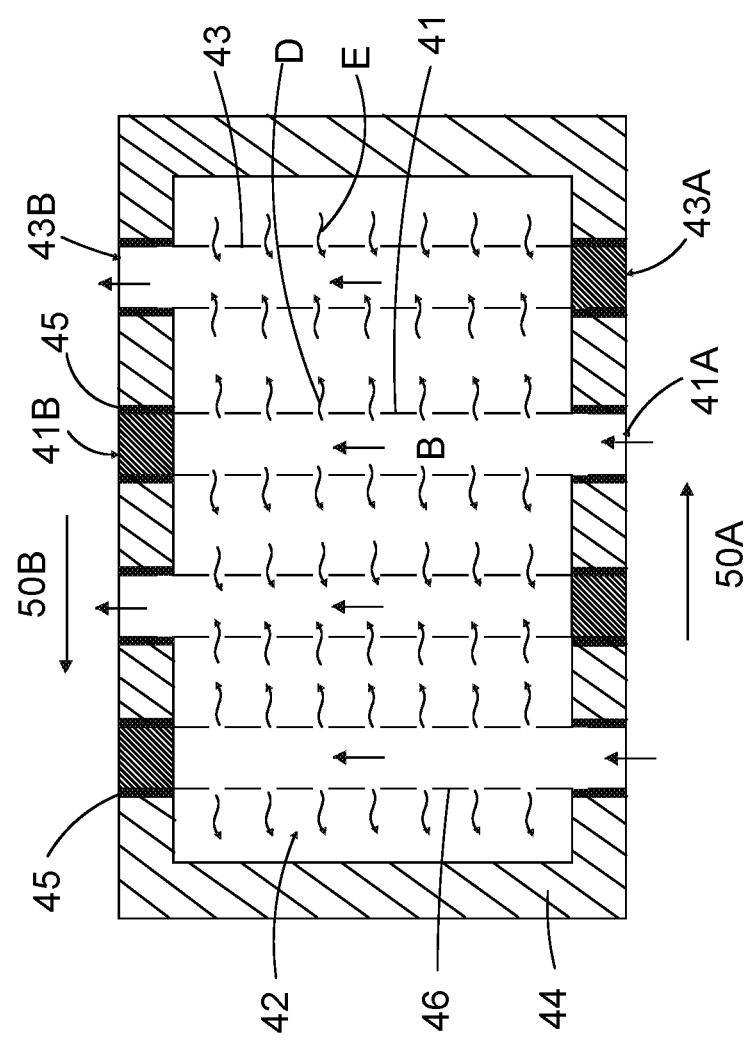
FIG. 2C illustrates a longitudinal cross-section through the electrode assembly represented in FIG. 2A.

As further illustrated in FIG. 2C, both ends of each distributor tube 46 are located within holes 45 provided in frame 44. Some of the distributor tubes such as the one indicated with numeral 41, are designed to allow the flow of electrolyte from the storage tank to the electrode material while other distributor tubes such as the one indicated with numeral 43 are designed to allow the flow of electrolyte from the electrode material back towards the storage tank. Distributor tubes 41 have an open inlet 41A which, in an operational battery stack, is fluidly connected to the flow 50A of electrolyte supply, and a sealed outlet 41B. Distributor tubes 43 have a sealed inlet 43A and an outlet 43B which, in an operational battery stack, is open to the flow 50B of electrolyte discharge to the electrolyte tank. Due to the construction of the distributor tubes, in an operational flow battery, the electrolyte can flow from tubes 41, through the electrode material, to distributor tubes 43 as indicated by arrows D and further explained below.

As illustrated in FIG. 2D, distributor tubes 46 have a tubular shape with an interior passage 54 through which electrolyte flows in one direction B, and a wall 56 surrounding the interior passage. The interior passage of the distributor tube can be an open passage as illustrated in FIG. 2D, or can be filled with a material having a high porosity, more specifically a higher porosity than the electrode material. In any case, the interior passage of the distributor tube has to allow the flow of electrolyte with a low pressure differential along the tube, preferentially along the entire length of the tube. Wall 56 of the distributor tube can comprise a plurality of holes 58, as illustrated in FIGS. 2C and 2D, which allow the flow of electrolyte from the interior passage to the electrode material as illustrated by arrows D in FIGS. 2C and 2D to distribute the electrolyte through the electrode material or from the electrode material to the interior of the distributor tube as illustrated by arrows E in FIG. 2C. Holes 58 can be evenly distributed along the length of the tube to allow an even distribution of electrolyte through the electrode material or, as a person skilled in the art would easily understand, the density of holes can vary according to the areas of the electrode material which require more or less electrolyte. Alternatively, wall 56 of distributor tube 46 can be a porous sleeve with pores having dimensions that allow the flow of electrolyte through the sleeve under higher pressure differentials than the pressure differential present in the interior passage.

As illustrated in FIG. 2C the ends of the distributor tubes are sealed in holes 45 of frame 44 to prevent any flow of electrolyte, except for the dedicated paths through the distributor tubes 41 and 43. The electrolyte flows through the open inlet of a distributor tube 41 and through interior passage 54 of the tube and is distributed through holes 58 to the electrode material as illustrated by arrows D, reaching distributor tube 43 that is placed within the electrode material in the proximity of distributor tube 41, and entering the interior passage of distributor tube 43 through holes 58 provided in the wall of the tube as illustrated by arrows E. Due to the lower pressure differential between the ends of distributor tube, the electrolyte flows to the outlet 43B of the distributor tube and into the flow 50B of electrolyte discharge to be returned to the electrolyte tank.

A person skilled in the art would recognize that the dimensions of the distributor tubes, of the interior passage and of the holes in the wall of the distributor tubes, or respectively the porosity of the material occupying the interior passage and the porosity of the wall material, are calculated to allow the flow of electrolyte through the interior passage with a low pressure differential and to allow the flow of electrolyte into the electrode material.

In FIGS. 2A and 2B the distributor tubes are illustrated to be evenly distributed along the entire surface of the electrode material and spanning across the entire area of the electrode assembly. It is to be understood while generally an equal frequency and spacing between distributor tubes is preferred for achieving and uniform electrolyte flow through the porous electrode material, in some other embodiments the frequency and spacing between the distributor tubes can vary. As an example, when a non-uniform electrolyte distribution is preferred, the distributor tubes do not span across the entire area of the electrode material. Also in the present illustration of this embodiment all tubes are presented as having the same dimensions (e.g. cross-section). In other embodiments, each of the distributor tube can have a different cross-sectional dimension, or some distributor tubes can have different cross-sectional dimensions. Similarly some distributor tubes can have more holes or a more porous wall material than others.

Figure 3:
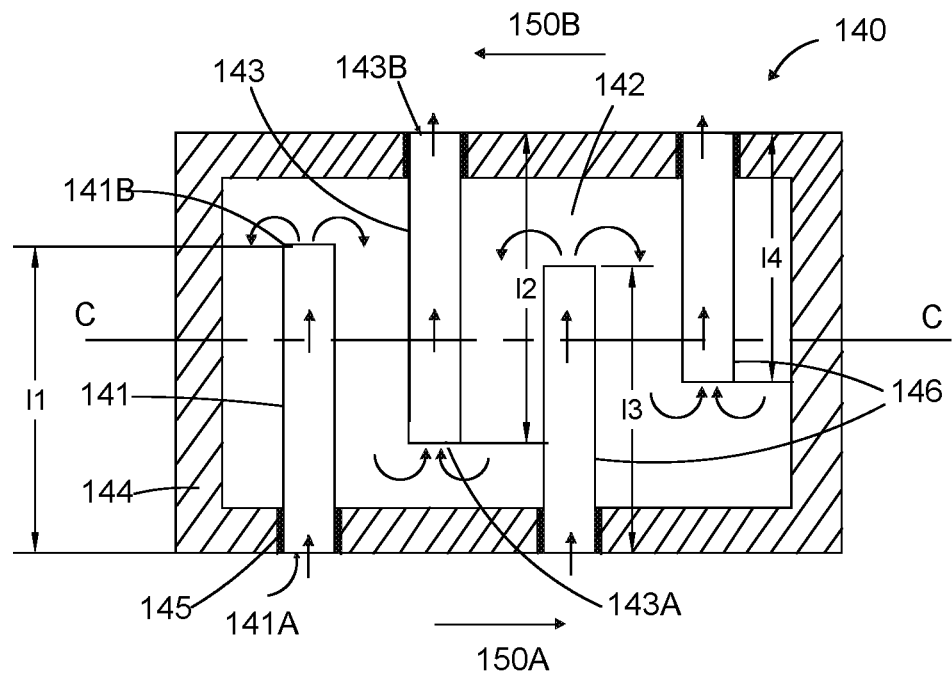
FIG. 3 illustrates a cross-sectional view through an electrode assembly according to a second embodiment of the present invention.

FIG. 3 illustrates a second embodiment of the present invention. In this embodiment, electrode assembly 140 comprises a porous electrode material 142 surrounded by a frame 144 and distributor tubes 146 which are entirely embedded in the electrode material in a similar way as the distributor tubes illustrated in FIG. 2B. Only four distributor tubes 146 are illustrated in FIG. 3 for the purpose of simplifying the present illustrations. A person skilled in the art would easily understand that a larger number of distributor tubes can be used and that the distributor tubes can be distributed across the surface of the electrode material evenly or their density and frequency can vary from one area of the electrode assembly to the other according to the desired electrolyte distribution.

In FIG. 3 electrode assembly 140 is illustrated in an operational state as it would be in a flow battery, more specifically in fluid communication with the electrolyte supply and discharge. As illustrated in FIG. 3, one distributor tube 141 has an inlet 141A open to the flow of electrolyte supply 150A and an outlet 141B that is open into the electrode material and does not communicate with the discharge flow of electrolyte 150B. The neighbouring distributor tube 143 has an inlet 143A that is open to the electrode material and an outlet 143B that is fluidly communicating to the discharge flow of electrolyte 150B. As in the previous embodiment, the distributor tubes 146 have a wall and an interior passage, the only difference being that in this second embodiment, the wall of the distributor tube does not have to be provided with holes or pores that allow the flow of electrolyte through the tubular wall. The electrolyte is distributed through the electrode material when it exits through the tube's outlet located within the electrode material, as illustrated by the arrows. The electrolyte then enters one of the neighbouring tubes that has an inlet open to the electrode material and exits the distributor tube through the end of the tube that is connected to the electrolyte discharge flow. In this arrangement, the current shunt length is almost entirely provided within the electrode assembly, compared to the solutions from the prior art where the supply/discharge channels in the frame provide the only shunt length.

In some other embodiments distributor tubes 146 can be provided with holes or with a higher porosity wall, preferably towards the end of the tube that opens within the electrode material, if desired.

In some embodiments, the ends of the distributor tubes 146 connected to the electrode frame can protrude outside of the frame through the holes 145. As illustrated in FIG. 3 the length of the distributor tubes can vary. Some tubes can have an equal length (e.g. l1=l2) while others can have different lengths (e.g. l1 can be different than l3 and different than l4).

The electrode assembly illustrated in FIG. 3 has a midpoint line C-C. In preferred embodiments, distributor tubes 146 extend beyond the midline for a better distribution of the electrolyte through the electrode material.

In all embodiments of the present disclosure, the frame of the electrode assembly can be an injection molded frame provided with holes to allow the penetration of the distributor tubes through the electrode material.

Figure 4:
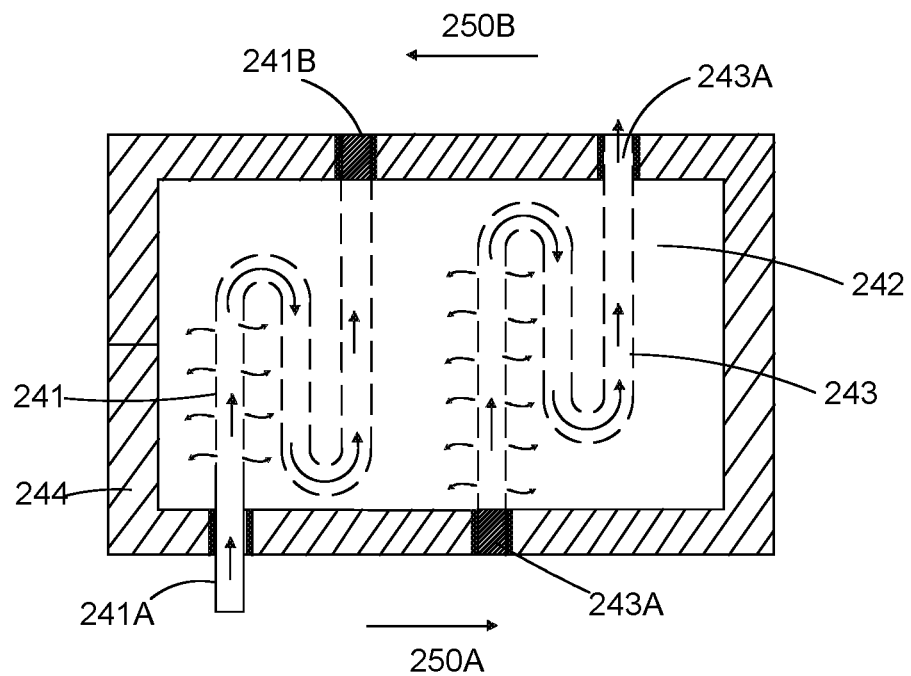
FIG. 4 illustrates a cross-sectional view through an electrode assembly according to another embodiment of the present invention.

FIG. 4 illustrates another embodiment of the present invention. FIG. 4 illustrates only two distributor tubes, but a person skilled in the art would easily understand that in other embodiments more than two distributor tubes can be provided. Distributor tube 241 has a serpentine shape with an inlet 241A connected to the electrolyte supply flow 250A and a sealed outlet 241B and distributor tube 243 has also a serpentine shape with a sealed inlet 243A and an outlet 243B open to the electrolyte discharge flow 250B. In this embodiment, the distributor tubes are provided with holes or pores in the wall of the tube, as discussed in relation to FIGS. 2A and 2B, and for ease of manufacturing the tubes are only partially embedded in the electrode material through a method further presented below in relation with FIGS. 6C and 6D.

In an alternative embodiment to the one illustrated in FIG. 3, the distributor tubes 146 which have their inlet or outlet open to the electrode material could also have a serpentine shape similar to the one illustrated in FIG. 4.

Figure 6A:
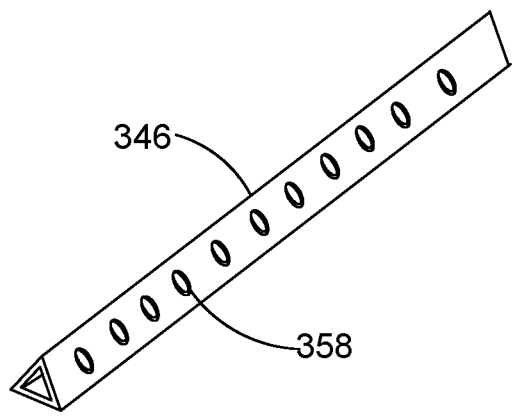
FIG. 6A illustrates a view of a distributor tube having a triangular cross-section that can be used in an electrode assembly of the present invention and FIG. 6B illustrates such an electrode assembly.

In all the embodiments presented here the distributor tubes can have a round cross-sectional shape or they can have any other shape, for example a triangular shape as illustrated in FIG. 6A.

Figure 5:
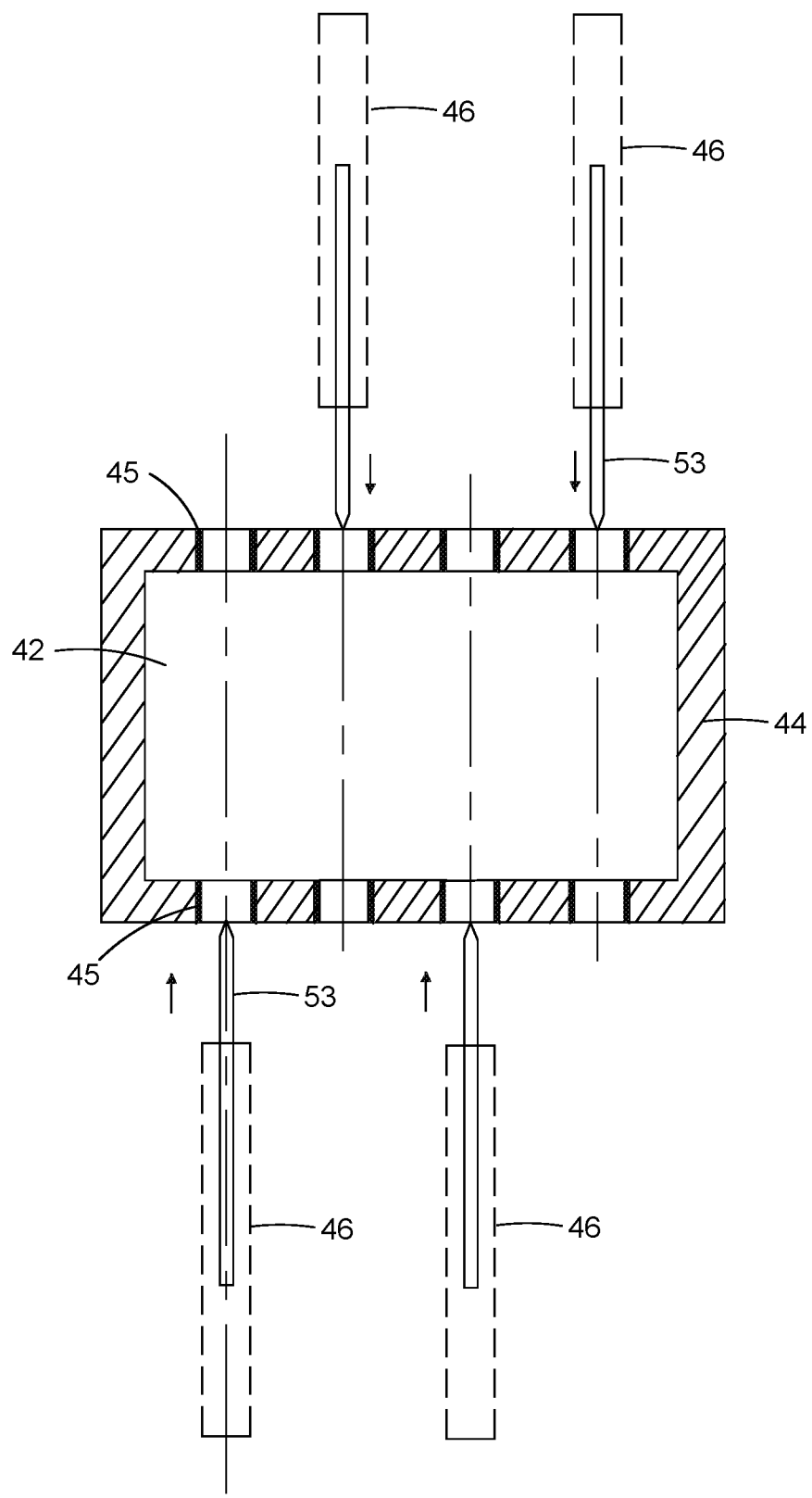
FIG. 5 illustrates one method of manufacturing the electrode assembly of the present invention.

FIG. 5 illustrates a method of manufacturing the electrode assembly according to the present invention, and more specifically according to the embodiment illustrated in FIGS. 2A, 2C and 3. Distributor tubes 46 are inserted into the porous electrode material 42 through holes 45 provided in frame 44 using locating needles 53.

In a first step of this method, electrode material 42 is placed within frame 44, then locating needles 53 are inserted through holes 45 from either side of the frame and through the electrode material to reach holes 45 on the opposite side of the frame. In a next step, distributor tubes 46 are slid through holes 45 and through the holes provided in the electrode material by the insertion of the locating needles. The needles help locate the distributor tubes within the electrode material and in the holes of the frame. Next, distributor tubes are seal welded relative to the holes in the frame and some inlets/outlets of the distributor tubes are sealed off to prevent any fluid communication with the electrolyte in an operational flow battery.

Distributor tubes can be made for example of polypropylene (PP) or polyethylene (PE) which are low cost materials and can seal easily into the frame edge, which lowers the cost of the manufacturing process overall.

Figure 6B:
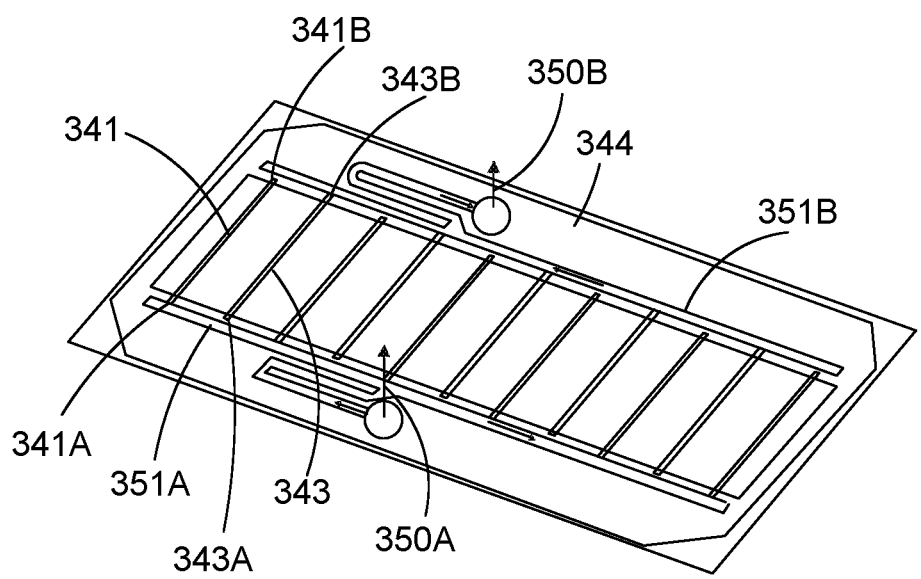

Another embodiment of the electrode assembly according to the present invention and a method of manufacturing it is illustrated in FIGS. 6A, 6B, 6C and 6D. The embodiment illustrated in FIGS. 6A and 6B is similar to the embodiment illustrated in FIGS. 2A and 2C with the difference that distributor tubes 346 have a triangular cross-section and that they are only partially embedded into the electrode material as further explained here. Distributor tubes 346 are provided with holes 358 preferably along their entire length, as illustrated in detail in FIG. 6A and further implied, although not shown, for the distributor tubes 341 and 343 in FIGS. 6B, 6C and 6D. Some distributor tubes 341 have an inlet 341A fluidly communicating with the electrolyte inlet channel 351A provided in the electrode frame 344 (and respectively with the electrolyte supply channel 350A in an operational flow battery) and a sealed off outlet 341B, while other distributor tubes 343 have a sealed off inlet 343A and an outlet 343B that fluidly communicates with the electrolyte discharge channel 351B provided in the electrode frame 344 (and respectively with the electrolyte discharge channel 350B in an operational flow battery). The electrolyte is supplied to the electrode assembly through the electrolyte supply channel 350A which, in a flow battery, is fluidly connected to the electrolyte storage tank and electrolyte is discharged from the electrode assembly back to the electrolyte storage through electrolyte discharge channel 350B.

Figure 6C:
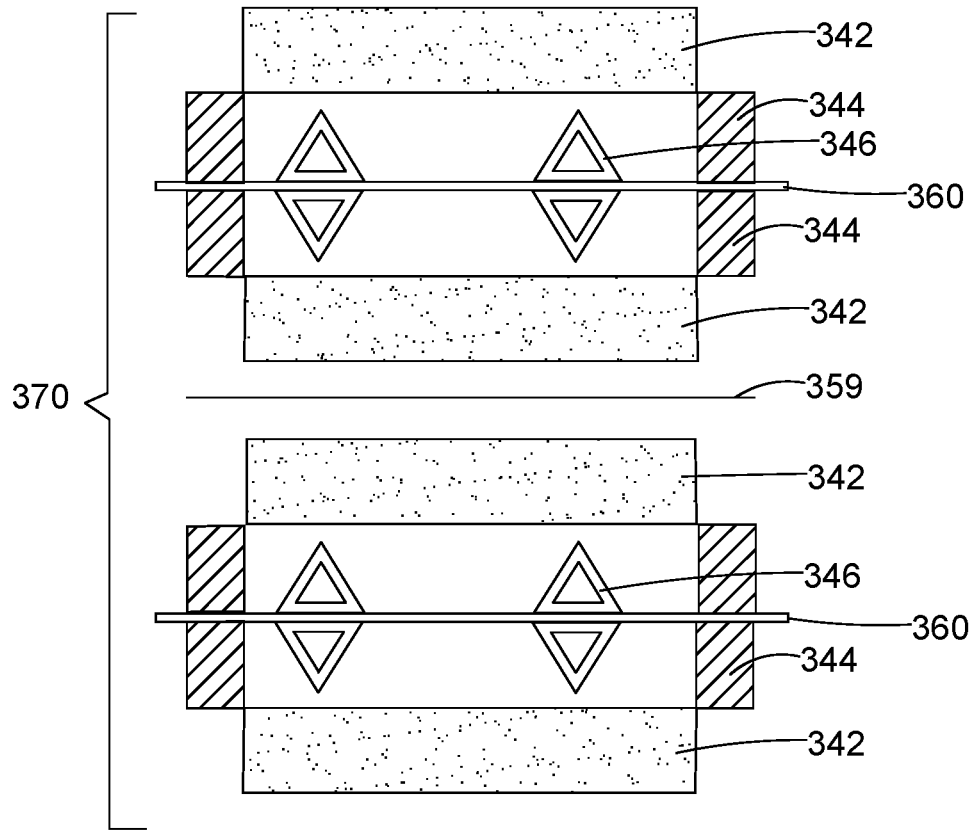
FIGS. 6C and 6D illustrate steps in the manufacturing method of a stack having an electrode assembly as the one illustrated in FIG. 6B which uses a distributor tube of a triangular cross-section.
Figure 6D:
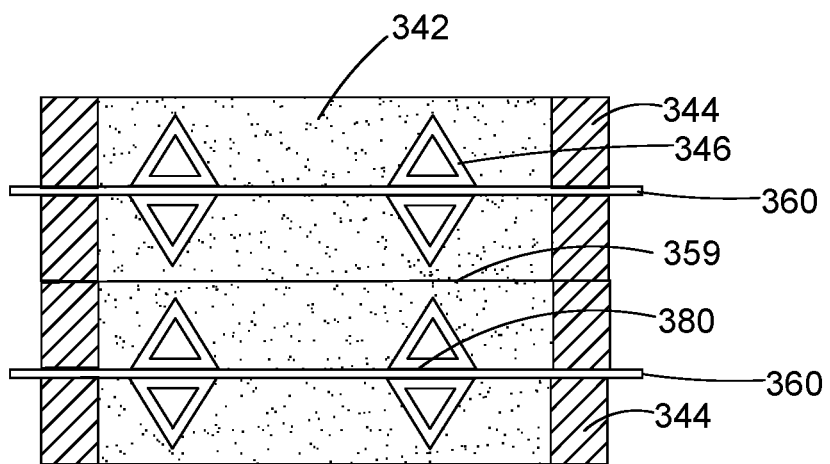

The manufacturing method of the embodiment of FIG. 6B is illustrated in FIGS. 6C and 6D. Distributor tubes 346 are first connected to frame 344 as illustrated in FIG. 6B, then the components of the stack are arranged on a flat surface, one of top of each other, such that each assembly made of the distributor tubes and the frame which they are connected to are placed next to an electrode material 342, the electrode materials 342 are separated by a separator 359 and each frame 344 carrying distributor tubes 346 is separated from the next frame with distributor tubes by a bipolar plate 360. The uncompressed stack 370 thus formed is illustrated in FIG. 6C.

This next step involves compressing stack 370 such that the distributor tubes 346 are pressed from top to bottom into the electrode material 342 as illustrated in FIG. 6D and a good connection is secured between the stack components.

As shown in FIG. 6D, in this embodiment in the compressed stack, distributor tubes are only partially embedded in the electrode material whereby a surface of the distributor tube indicated by reference number 380 is in contact with the bipolar plate and it is not surrounded by electrode material.

The method of manufacturing illustrated in FIGS. 6C and 6D is especially recommended for embodiments such as the one illustrated in FIG. 4 which comprises serpentine shaped distributor tubes, which would be more difficult to assemble using the previous method of manufacturing described here.

Figure 7A:
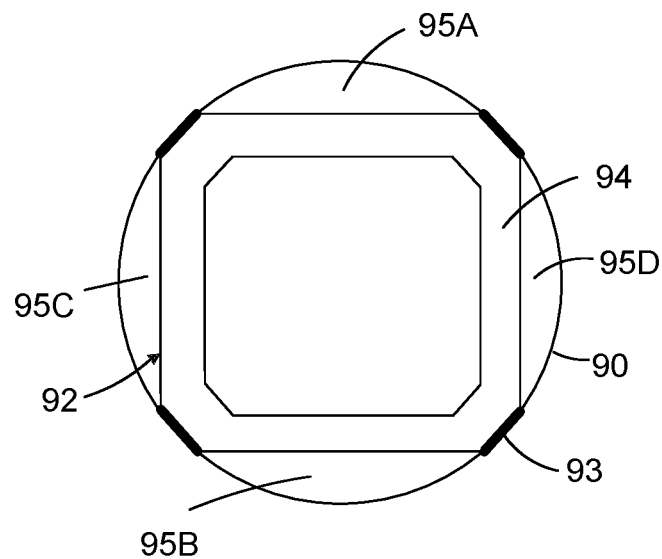
FIGS. 7A and 7B illustrate a system and a method for compressing and sealing a stack of flow cells in a flow battery.
Figure 7B:
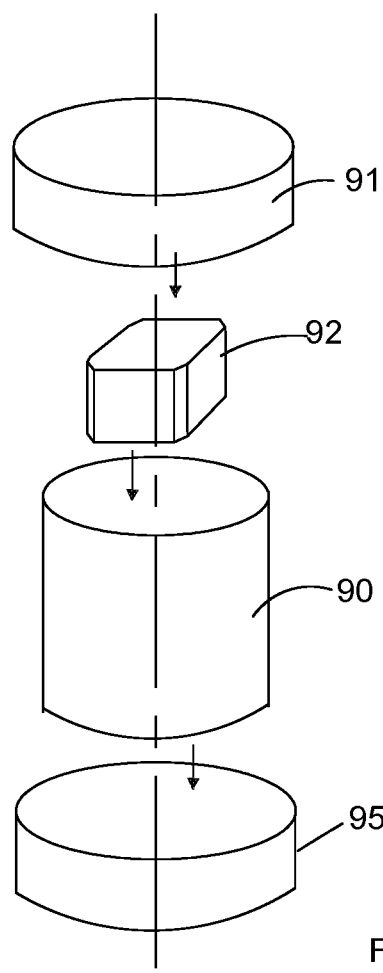

FIGS. 7A and 7B illustrate a system and a method for compressing and sealing a stack of flow cells in a flow battery. The battery can comprise, for example, flow cells with electrode assemblies having a construction described in the embodiments of the present invention. The system uses a cylindrical plastic shell 90 which encloses stack 92, and is provided with two end plates 91 and 95, the cylindrical plastic shell and the end plates holding the flow cells in the stack together while sealing all the stack components. The cylindrical plastic shell is compressing the stack in a radial direction while the end plates are compressing the stack in an axial direction. While the cylindrical plastic shell 90 is illustrated as having a circular internal cross-section, a person skilled in the art would easily understand that modifications of such an internal cross-section can be made as long as the internal surface of the cylindrical plastic shell comes into contact with the stack corners or edges. Also, even if the stack of flow cells is illustrated here as having a square shape other stacks can have different shapes (e.g. rectangular).

The four corners of the stack are sealed relative to the interior surface of the cylindrical shell 90 with seals 93, to create four sealed compartments 95A, 95B, 95C and 95D, between the stack and the interior surface of the cylindrical plastic shell. Compartments 95A and 95B represent, for example, the positive electrolyte supply and respectively discharge compartments, and compartments 95C and 95D represent the negative electrolyte supply and respectively discharge compartments. While this compression system works better with a stack of flow cells comprising electrodes having a construction as described in the present invention, it could also be used with a stack of flow cells having a construction known in the prior art. This compression system is especially compatible with flow cells having an electrode assembly where the cell inlet/outlet shunt lengths are created by the distributor tubes within the electrode material, as illustrated in the embodiments described here where there is no need to accommodate such cell shunt lengths into the electrode frame perimeter.

The materials of the plastic cylindrical shell 90 and the end plates 91 and 95 of the present compression system have the same or about the same thermal expansion coefficient as the material of the electrode frames 94. Having the same or about the same thermal expansion coefficient as the frames, the cylindrical plastic shell provides a good seal at the stack corners at various operating temperatures and since both the cylindrical plastic shell and the end plates have the same or about the same thermal expansion coefficient as the frames, there is no need to use tie rods and springs which are generally used in the prior art to compensate for different thermal expansion coefficients while maintaining the compression of the flow battery stacks. In the present compression system the compression of the flow cells remains constant over the typical storage and operating temperatures of the stack which can vary for example between −40 and 70 degrees Celsius.

Another advantage of the present compression system is that the four sealed compartments formed between the cylindrical plastic shell and the stack frames can contain any internal leaks between the frames in the stack or between the frames and the other components of the flow cells (e.g. separators, bipolar plates, electrode materials).

The compression system described above can be used for flow battery stacks which generally require a much lower compression force acting on the flow cells in the stack than for example fuel cells.

The method of compressing and sealing the stack is illustrated in FIG. 7B which shows how stack 92 is slid within cylindrical plastic shell 90 and the assembly thus formed is then positioned between end plates 91 and 95 and assembled together.

The distributor tubes of the present invention can be made of any non-conductive material which is compatible with the electrolyte chemistry. For example, for a vanadium flow battery, distributor tubes can be made of polypropylene (PP) or polyethylene (PE) which are low cost materials and can seal easily into the frame edges. Other materials for the distributor tubes can be polytetrafluoroethylene (PTFE), polyvinylidene fluoride (PVDF), ethyl vinyl acetate (EVA), PE copolymers, UHMW PE, thermoplastic polyurethane, polyethersulfone, polycarbonate and polycarbonate alloys, just to name a few. Examples of commercial tubes that could be used for the present application are the plastic porous tubes used for medical or industrial filtration systems, such as the ones produced by Porex® or Parker TexLoc®.

In all the embodiments presented here the electrode material is porous but can have a uniform porosity throughout its entire volume or the porosity of the electrode material can vary with certain areas of the electrode material having a higher porosity than others to promote the electrochemical reactions in those areas.

In the embodiments described here, the distributor tubes are either entirely embedded within the electrode material, which is interpreted to mean that the distributor tubes are entirely surrounded by electrode material as illustrated best in FIGS. 2A and 2B, or can be partially embedded within the electrode material, which is interpreted to mean that at least a part of a tube's surface is not surrounded by electrode material and in an assembled stack is exposed to the bipolar plate, for example, and not to the electrode material, as illustrated best in FIGS. 6B and 6C.

Throughout the disclosure, the electrode frame is illustrated as having a rectangular shape with straight corners. A person skilled in the art would easily understand that in other embodiments the electrode frames can have other shapes, for example a rectangular shape with rounded corners, etc. In some figures, the electrode materials (e.g. 42, 142, 242) are not illustrated as a porous material, but a person skilled in the art would understand that this was done for the purpose of simplifying the drawings and that in all the figures the porous electrode materials are implied to be illustrated as electrode material 342 in FIG. 6D.

In all the embodiments described here, the separator separating the negative electrode assembly and the positive electrode assembly in a flow cell of a battery stack can be either a micro-porous separator or an ion exchange membrane.

In all the embodiments described here, the bipolar plates which separate the electrodes are not provided with frames and/or with features for circulating, guiding, or regulating the flow electrolyte as described in some prior art documents, since the electrolyte circulation is achieved through the distributor tubes entirely or partially embedded in the electrode material. The bipolar plates, illustrated in the present invention, have only the role of separating the distributor tubes and/or the electrodes, while being electrically conductive.

An example of a flow battery according to the present invention is a vanadium flow battery which is a rechargeable flow battery that employs vanadium ions in different oxidation states to store chemical potential energy.

The advantages of the present invention are that the electrode assemblies having a construction described here provide an improved electrolyte distribution through the electrode material with a low pressure drop and provide a shunt current control without requiring extra frame area or material to accommodate extended shunt lengths. The present electrode assemblies are easy to manufacture, do not require some high tolerance positioning and/or attachment of the electrodes relative to the electrolyte distribution channels, do not require permanent attachment or bonding of the bipolar plate to the plastic cell frame as in the prior art, and instead use lower cost materials and manufacturing techniques suitable for high volume manufacturing. Furthermore, in the design disclosed in the present invention, the electrolyte flow rate and reaction rate may be increased due to the positioning and design of the distributor tubes within the electrode material, and the electrode characteristics (porosity, electrolyte distribution, etc.) can be changed to achieve a higher energy efficiency and higher current density than the solutions known in the prior art.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings. Such modifications are to be considered within the purview and scope of the claims appended hereto.

We claim:

1. A flow battery comprising at least one flow cell which comprises:
    a negative electrode assembly and a positive electrode assembly;
    a separator separating the positive electrode assembly and the negative electrode assembly; and
    a first and a second bipolar plate, each bipolar plate being adjacent to a respective electrode assembly;
    wherein at least one of the negative or positive electrode assemblies is an electrode assembly comprising:
    a porous electrode material;
    a frame surrounding the porous electrode material;
    at least a first distributor tube embedded in the porous electrode material, the first distributor tube having an inlet for supplying electrolyte to the porous electrode material; and
    at least a second distributor tube embedded in the porous electrode material, the second distributor tube having an outlet for discharging electrolyte out of the porous electrode material;
    wherein the frame and the distributor tubes are made of an electrically non-conductive plastic material; and
    wherein the first distributor tube and the second distributor tube are hollow tubes each having an interior flow passage and a wall surrounding the interior passage, wherein the wall of the hollow tubes is made of a solid material provided with at least one hole to allow the flow of electrolyte through the wall of the distributor tube into the porous electrode material.

2. The flow battery claim 1 wherein the first and second distributor tubes extend between a first side of the frame and a second side of the frame, beyond the midpoint of the electrode assembly between the two sides of the frame.

3. The flow battery of claim 1 wherein the first distributor tube has an outlet sealed to the frame and the second distributor tube has an inlet sealed to the frame.

4. The flow battery of claim 1 wherein the first distributor tube has an outlet open to the porous electrode material and the second distributor tube has an inlet open to the porous electrode material.

5. The flow battery of claim 1 wherein at least one of the first or second distributor tubes has a circular cross-section.

6. The flow battery of claim 1 wherein at least one of the first or second distributor tubes has a triangular cross-section.

7. The flow battery of claim 1 wherein at least one of the first or second distributor tubes is entirely embedded within the porous electrode material.

8. The flow battery of claim 1 wherein at least one of the first or second distributor tubes is partially embedded in the porous electrode material.

9. The flow battery of claim 1 comprising a plurality of first and second distributor tubes which are evenly distributed across the area of the porous electrode material.

10. The flow battery of claim 1 comprising a plurality of first and second distributor tubes of equal cross-sectional flow areas.

11. The flow battery of claim 1 wherein the length of the first distributor tube is equal to the length of the second distributor tube.

12. The flow battery of claim 1 wherein the first and second distributor tubes are made of polyethylene or polypropylene.

* * * * *